United States Patent [19]
Lathrop et al.

[11] Patent Number: 5,109,481
[45] Date of Patent: Apr. 28, 1992

[54] QUADRATIC INTERPOLATION FOR SHADED IMAGE GENERATION

[75] Inventors: Olin G. Lathrop, Groton; David B. Kirk, Concord; Douglas A. Voorhies, Framingham, all of Mass.

[73] Assignee: Hewletet-Packard Company, Palo Alto, Calif.

[21] Appl. No.: 77,202

[22] Filed: Jul. 24, 1987

[51] Int. Cl.⁵ .............................................. G06F 15/20
[52] U.S. Cl. ...................................................... 395/133
[58] Field of Search ................................ 364/518-522; 340/701, 703, 720

[56] References Cited

U.S. PATENT DOCUMENTS

| | | | |
|---|---|---|---|
| 4,511,989 | 4/1985 | Sakamoto | 340/703 X |
| 4,609,993 | 9/1986 | Shimizu | 364/522 |
| 4,648,049 | 3/1987 | Dines et al. | 340/703 X |
| 4,808,988 | 2/1989 | Burke et al. | 364/522 X |
| 4,829,587 | 5/1989 | Glazer et al. | 364/723 X |

OTHER PUBLICATIONS

Gouraud, H., Jun. 1971, "Computer Display of Curved Surfaces," Ph.D. Dissertation, Dept. of Electrical Engineering, University of Utah.

Phong, B. T., Dec. 1973, "Illumination for Computer Generated Images," Ph.D. Dissertation, Dept. of Electrical Engineering, University of Utah.

Foley, J. D. and A. Van Dam, 1984, "Fundamentals of Interactive Computer Graphics," Addison-Wesley, Reading, MA, pp. 575-590.

Bishop, G. and Weimer, D. M., 1986, "Fast Phone Shading," ACM Computer Graphics, vol. 20, No. 4, pp. 103-106.

Primary Examiner—Heather R. Herndon
Attorney, Agent, or Firm—Richard F. Schuette

[57] ABSTRACT

A system for quadratic and higher order interpolation of pixel color and other pixel values into a bitmap image enables enhanced shading for generation of realistic computer graphics images. The system incorporates modules for executing incremental evaluation of pixel values, utilizing forward differencing in N arbitrary directions of incremental evaluation. The system alternatively incorporates non-incremental evaluation elements for directly evaluating polynomials or executing a spline function of control points.

15 Claims, 5 Drawing Sheets

| SCAN DIRECTION | SIGN OF DX | FLIP A/B FOR INTERPOLATORS | PICTURE, (LEADING EDGE) |
|---|---|---|---|
| LEFT TO RIGHT | + | NO | |
| LEFT TO RIGHT | − | YES | |
| RIGHT TO LEFT | + | YES | |
| RIGHT TO LEFT | − | NO | |

QUADRATIC INTERPOLATION FOR SHADED IMAGE GENERATION

BACKGROUND OF THE INVENTION

The present invention relates generally to the field of digital computers, and in particular, relates to apparatus for controlling computer graphics displays.

An important application of computer graphics involves the creation of realistic images of three dimensional objects. Designers of three dimensional objects such as automobiles, aircraft, and buildings may want to see how a preliminary design will look. Creating realistic computer-generated images is an easier, less expensive, and more effective method of seeing preliminary results than building models and prototypes. Computer generated images allows a greater number of alternative designs to be considered in a shorter time. Often, the design work itself is performed on a computer system, using a computer-aided design (CAD) or other engineering workstation. In such a case, a digitized representation of the three dimensional object is already available to use as the basis for the computer generated image.

Simulation systems are another application for computer generated three dimensional images. Such systems present images which not only must appear realistic, but which also change dynamically.

One approach which helps produce visual realism in computer generated images is shading of surfaces. Variations in surface shading add visual information of the type normally found in a visual environment, so that an observer's depth perception mechanisms can properly resolve any ambiguities caused when three dimensional objects are projected into two dimensions.

Computer image generation systems often represent curved surfaces as a mesh of planar polygons that are shaded to restore a smooth appearance. Most computer image generation systems represent curved surfaces as a mesh of planar polygons because polygons can be transformed quickly with well known algorithms. Because the polygonal representation is an artifact of the image generation method, and is not of interest to a viewer, image generating systems attempt to restore a smooth appearance to surfaces thus represented by varying the intensity across polygons. This shading operation is performed for one million or more pixels per image, and thus its efficiency is crucial to the performance of the image generating system.

A variety of shading models and shading methods are used in computer graphics systems to shade surfaces. Shading models attempt to describe the reflection characteristics of a surface, and shading methods are used in conjunction with shading models to calculate intensity values for pixels constituting a computer generated image of a surface. Conventional shading methods include constant or "flat" shading, linear interpolation shading, (typically referred to as Gouraud shading), and normal-vector interpolation shading (typically referred to as Phong shading).

These shading methods are discussed generally in "Fundamentals of Interactive Computer Graphics," Foley, Van Dam, Addison-Wesley, 1984, which is incorporated herein by reference. In particular, linear interpolation shading is discussed in Gouraud, "Continuous Display of Curved Surfaces," Ph. D. Dissertation, Department of Computer Science, University of Utah, Salt Lake City, June, 1971, incorporated herein by reference. Normal-vector interpolation shading is discussed in Phong, "Illumination for Computer-Generated Images," Ph. D. Dissertation, Department of Electrical Engineering, University of Utah, Salt Lake City, July, 1973, also incorporated herein by reference.

Constant shading calculates a single intensity value for shading an entire surface. The major deficiency of constant shading is that when applied to the polygon meshes typically employed in computer graphics to represent curved surfaces, constant shading produces a set of polygons resembling flat facets.

The most commonly used shading method in real-time image generation systems is linear interpolation shading, or Gouraud shading. Gouraud shading computes the intensity at each point by linear interpolation of the intensities at the vertices. The method is widely used in real-time systems because it produces shaded images of acceptable quality with only one addition per pixel.

Linear interpolation shading, or Gouraud shading, eliminates intensity discontinuities, but does not eliminate discontinuities in the first derivative, or slope, of the intensity curve at the edges of adjacent polygons. Linear interpolation shading thus produces Mach bands, or pronounced apparent intensity changes at the edges of adjacent polygons.

Normal-vector interpolation shading, or Phong shading, interpolates surface normal vectors, rather than intensity, across a polygon. The surface normal vector is interpolated between starting and ending normals which are themselves interpolations along the edges of the polygon. At each pixel along a scan line, a new intensity calculation is performed. Phong shading reduces Mach band problems, because an approximation to the normal vector is used at each point, but greatly increases the cost of the shading, because a complete intensity calculation is performed at each pixel.

In order to completely remove Mach band effects, the color or intensity at the edges of adjacent polygons approximating a curved surface must be the same, and the first derivative of the color with respect to screen coordinate axes x and y must also be the same. Higher order interpolation can yield better results than linear interpolation.

There exists a need for a computer graphics shading system which can provide realistic shading of regions, while maintaining low cost, low complexity, and high processing speed. A shading system implementing second order, or quadratic, interpolation could provide realistic shading at low cost.

It is thus an object of the invention to provide an improved computer graphics display controller system.

It is a further object of the invention to provide an improved system for shaded image generation.

It is another object of the invention to provide a system for executing quadratic interpolation so that the first derivative of color at the edges and vertices of polygons tends toward being continuous.

It is yet another object of the invention to provide an efficient and inexpensive system for shaded image generation, utilizing quadratic and higher order interpolation.

SUMMARY OF THE INVENTION

The invention achieves the above objects by providing a system for second order and higher order interpolation of pixel values into a bitmap image.

The term "pixel values," as used herein, includes, but is not limited to, R, G, B, Z and α values, where R, G and B are color values, Z is a Z buffer value, and α is a transparency fraction value, as known in the art.

In one aspect of the invention, elements are utilized for providing incremental evaluation of pixel values. In a further aspect of the invention, forward differencing elements are provided, to execute the conventional incremental polynomial evaluation method referred to as forward differencing in n arbitrary directions of incremental evaluation, where n is a positive integer.

In an embodiment of the invention, forward differencing is executed in three directions of incremental evaluation according to Bresenham's algorithm. Bresenham's algorithm is discussed in Bresenham, J. E., "Algorithm for Computer Control of Digital Plotter," IBM System Journal, 4(1) 1965, pp. 25-30, incorporated herein by reference. The three directions are defined as "A" and "B" incremental directions associated with a given vector, and an "X" direction across a predetermined coordinate axis of the surface. In another embodiment of the invention, forward differencing is executed in two directions of incremental evaluation, which may be orthogonal or non-orthogonal. In a preferred embodiment of the invention, two non-orthogonal directions are used: an "A" incremental direction associated with a given vector, and an "X" direction across a predetermined coordinate axis of the surface.

In another aspect of the invention, non incremental evaluation elements are employed. The non-incremental evaluation elements provide direct evaluation of polynomials, and, in a preferred embodiment of the invention, execute a spline of control points.

The invention will next be described in connection with certain illustrated embodiments. However, it should be clear that various changes, modifications and additions can be made by those skilled in the art without departing from the scope of the invention as defined in the claims.

DESCRIPTION OF ILLUSTRATED EMBODIMENTS

The invention provides apparatus for modifying simple Gouraud shading to interpolate differently than ordinary bilinear interpolation. Biquadratic interpolation can produce better quality shaded pictures by reducing the objectionable artifacts of Mach bands and highlight aliasing.

In order to completely remove Mach band effects, the color at the edges of adjacent triangles approximating a curved surface must be the same, and the first derivative of the color with respect to the x and y axes, which define the screen coordinate plane, must be the same also.

A significant improvement in image quality is achieved in the invention by using quadratic rather than linear interpolation of pixel values. The invention thus provides apparatus for calculation of the 1st and 2nd derivatives of pixel values.

Pixel values include, but are not limited to, R, G, B, Z and α values, as known in the art.

The approach is to constrain the behavior of a shaded region. The color at the vertices of adjacent regions must be exactly correct, and the first derivative of the color at the edges and the endpoints should tend toward being continuous. Adjacent regions should match first derivatives more closely.

The invention establishes these constraints by setting up a system of equations to adequately describe these relations. The correct 1st and 2nd derivatives are then a unique solution to the equations, assuming that the system is not over- or under- constrained.

Figure 1:
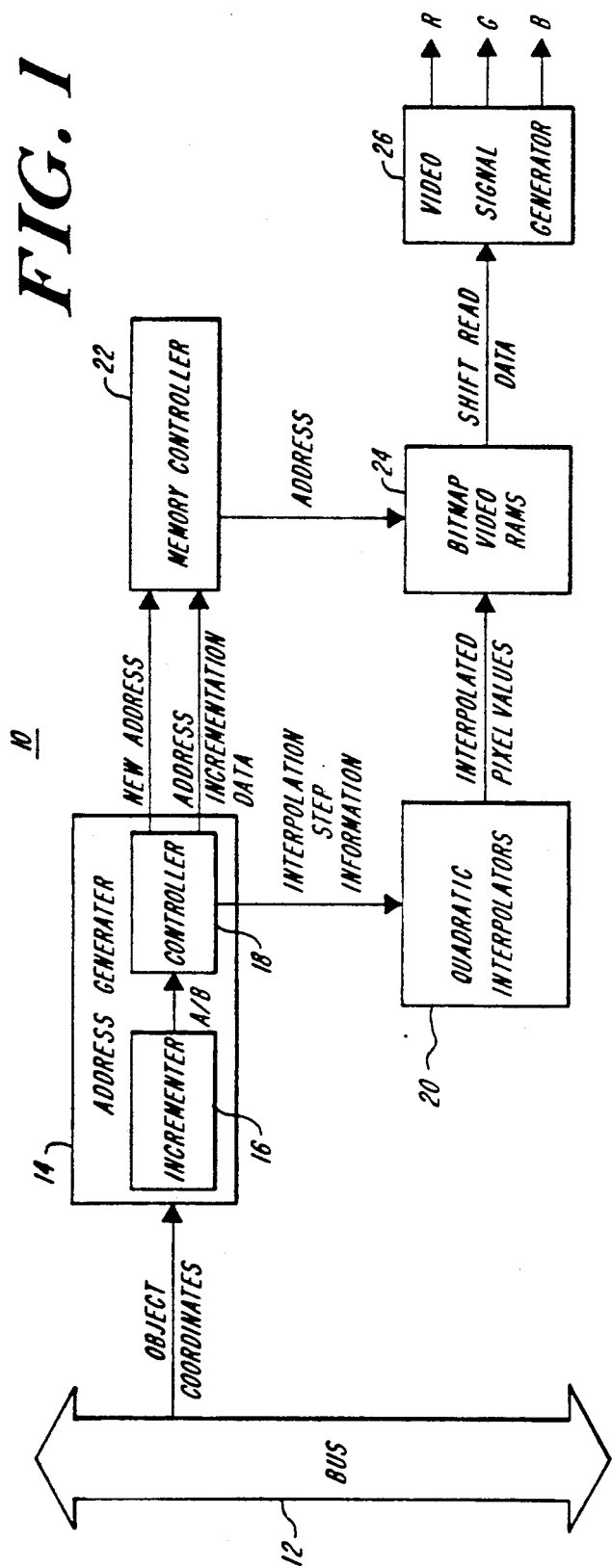
FIG. 1 is a block diagram illustrating a display controller system in accordance with the invention.

FIG. 1 is a block diagram illustrating the elements of a display controller system 10 in accordance with the invention. The system 10 includes a bus 12, an address generator 14 having incrementer 16 and controller 18, quadratic interpolators 20, a memory controller 22, bitmap video RAMs (VRAMs) 24, and video signal generator 26. Given the coordinates of an object to be displayed on a monitor, the system 10 calculates pixel address and pixel data values, including color, for each pixel corresponding to the object. The system output is the red, green and blue (RGB) video signals generated by video signal generator 26.

Address generator 14 receives object coordinates from bus 12, and divides higher order primitives, such as lines and polygons, into a sequence of per-pixel operations. Address generator 14 includes incrementer element 16, having hardware elements for incrementally stepping along a given vector, using the Bresenham algorithm, which is known in the art. Incrementer element 16 transmits to controller 18 incrementation signals representative of the value of incremental steps herein referred to as "A" and "B" steps. These "A" and "B" steps are discussed in greater detail below.

Controller 18, responsive to the incrementation signals generated by incrementer element 16, transmits interpolation step information to quadratic interpolators 20. This interpolation step information indicates to interpolators 20 the incremental interpolation step to execute. The quadratic interpolators 20 then execute incremental interpolations using preceding pixel values, thus calculating succeeding pixel values based on preceding pixel values. In particular, quadratic interpolators 20 can incorporate register and forward differencing module 21, constructed in accordance with known engineering techniques, for evaluating a quadratic or higher order function by a forward differencing method. Forward differencing is a known mathematical technique of incrementally evaluating a polynomial. In accordance with the invention, the interpolators 20, including register and forward differencing module 21, execute the forward difference method to evaluate a polynomial of second or higher order. The operation of the quadratic interpolators 20 is discussed in greater detail hereinafter.

Controller 18 simultaneously transmits address incrementation data to memory controller 22. This address incrementation data indicates to memory controller 22 what address incrementation steps to take to advance to a new address corresponding to a succeeding pixel to be set. Alternatively, controller 18 transmits a signal representative of a completely new address. This is required when the ne pixel is not adjacent to the old pixel.

The memory controller 22 therefore either loads a new address from the address generator 14, or incrementally steps to an adjacent pixel, using address incrementation data. In a preferred embodiment of the invention, when successive pixels are adjacent, controller element 18 transmits address incrementation data rather than new address data.

Interpolated pixel values generated by interpolators 20, and address bits from memory controller 22, are transmitted to VRAMs 24. The pixel data stored in VRAMs 24 are shift-read out into video signal generator 26, which contains digital to analog converter (DAC) elements for converting the data into analog RGB output signals, in a manner known in the art. The RGB signals are then used to drive a monitor.

Figure 2:
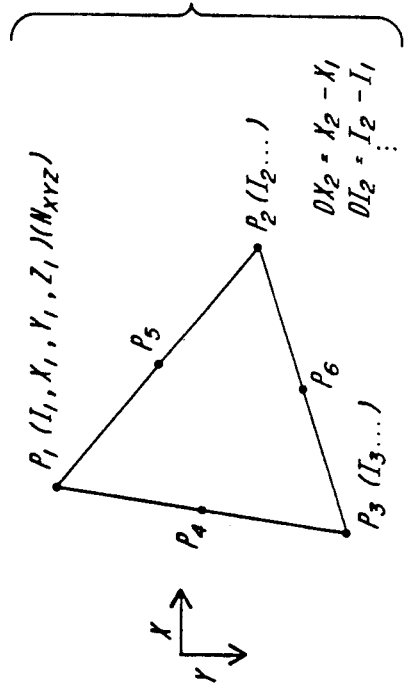
FIG. 2 is a schematic representation of a triangular region to be shaded.

The operation of interpolators 20 will next be discussed. Assume a triangle like that shown in FIG. 2. Any 6 linearly independent points may be selected and the associated derivatives solved for. The points $P_1$-$P_6$ shown in FIG. 1 are selected by way of example. $P_4$, $P_5$, $P_6$ are at the edge midpoints. Each point $P_1$-$P_6$ has associated intensity (I), X, Y, Z and normal vector $N_{xyz}$ values. Values for $P_4$, $P_5$, and $P_6$ are calculated by averaging X, Y, Z, normal vector $N_{xyz}$ values from $P_1$, $P_2$, $P_3$ and executing a new lightsource calculation for each.

In executing quadratic interpolation, there are five values to be solved for. They are:

X' = first derivative of intensity (R, G, B, Z, $\alpha$) in the X direction (dI/dX);

Y' = first derivative of intensity in the Y direction (=dI/dY);

X'' = second derivative of intensity in the X direction (=$d^2I/dX^2$);

Y'' = second derivative of intensity in the Y direction (=$d^2I/dY^2$);

XY'' = crossover second derivative (=d(dI/dX)/dY=d(dI/dY)/dX).

The given values are:

$I_1, \ldots, I_6$ = Intensity (R, G, B, Z, $\alpha$) at each predetermined point;

$X_1, \ldots, X_6$ = X coordinate at each predetermined point;

$Y_1, \ldots, Y_6$ = Y coordinate at each predetermined point.

The equation used to calculate I at an arbitrary point (X, Y) is:

$$I = (X - X_1)X' + (Y - Y_1)Y' + ((X - X_1)^2/2)X'' +$$
$$((Y - Y_1)^2/2)Y'' + ((X - X_1)(Y - Y_1))XY''$$

This expression must also be true at the specific points $P_2$-$P_6$. This gives us the set of 5 independent equations to solve for the 5 unknowns:

$$[X_N - X_1]X' + [Y_N - Y_1]Y' + [(X_N - X_1)^2/2]X'' +$$
$$[(Y_N - Y_1)^2/2]Y'' + [(X_N - X_1)(Y_N - Y_1)]XY'' = I_N$$

where N ranges from 2 to 6.

This is a system of linear equations which can be solved in a manner well known in the art.

The primary advantage of quadratic shading according to the invention is that the values all along the edges of shaded regions appear to be continuous in color, and the Mach band effect is greatly reduced from bilinear interpolation. An added advantage of quadratic interpolation according to the invention is that the specular highlights are more round, and reflect less of the polygon shapes. A software program which executes linear and quadratic interpolated shading is incorporated herein as Appendix I.

Figure 3:
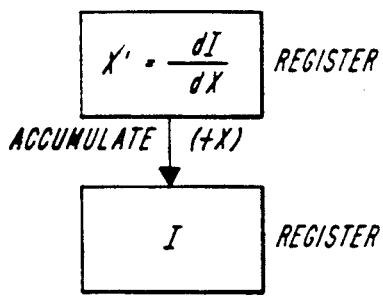
FIG. 3 is a block diagram of data registers utilized in executing linear incremental steps from pixel to adjacent pixel in a single incremental step direction.

FIG. 3 is a block diagram of data registers utilized in executing conventional linear incremental steps from pixel to adjacent pixel in a single incremental step direction. The arrows indicate accumulation operations. Accumulate operations, as known in the art, involve successive additions.

Figure 4:
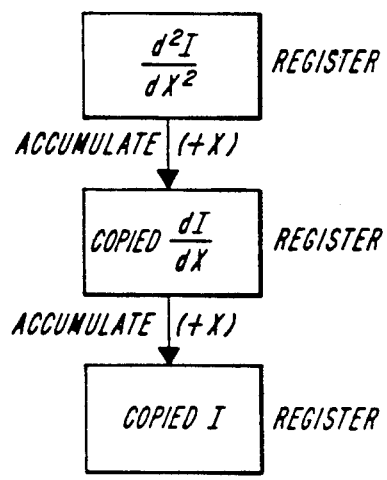
FIG. 4 is a block diagram of data registers used in executing quadratic incremental steps according to the invention from pixel to adjacent pixel in a single incremental step direction.

FIG. 4 is a block diagram illustrating registers 21 contained in interpolators 20 of FIG. 1. These registers can be utilized for executing the known polynomial evaluation technique of forward differencing in connection with the incremental evaluation of a quadratic polynomial according to the invention. The (+X) arrows between registers indicate that simultaneous addition operations are performed by the hardware elements, including registers 21, to evaluate a polynomial.

Figure 5:
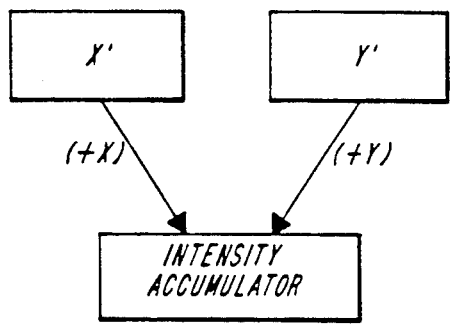
FIG. 5 is a block diagram of data registers utilized in executing linear incremental steps from pixel to adjacent pixel in two incremental step directions.

FIG. 5 is a block diagram of registers utilized in linearly stepping from pixel to adjacent pixel in two incremental directions. The arrows from the X' and Y' sections to the intensity accumulator section indicate accumulate operations. In FIG. 5, X'=dI/dX, and Y'=-dI/dY. Then for every iterative step to the right, I←I+X'; and for every step down I←I+Y'. Note that for convenience, a left-handed coordinate system, in which a downward step corresponds to positive Y, is used.

Figure 6:
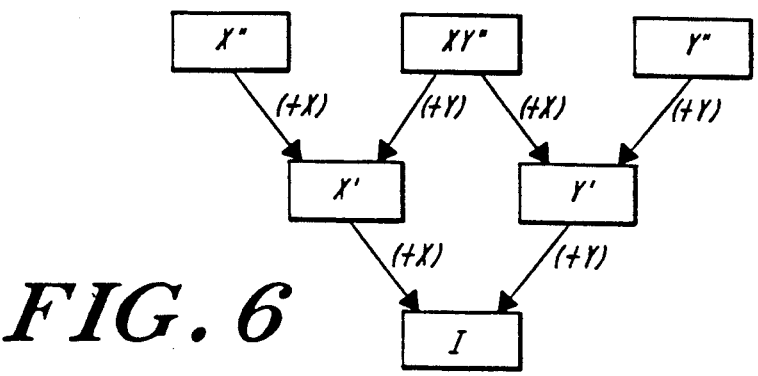
FIG. 6 is a block diagram of data registers used in executing quadratic incremental steps from pixel to adjacent pixel in two incremental step directions.

FIG. 6 is a block diagram of registers in interpolators 20 of FIG. 1, utilized in quadratic incremental steps from one pixel to an adjacent pixel. FIG. 6 illustrates accumulate operations for a one pixel step in +X, or a one pixel step in +Y. The terms X'', XY'', Y'' are fixed for each triangle, and X', Y' and I change with each interative calculation. The results of each calculation are accumulated in each respective register, as indicated by the (+X) and (+Y) arrows. The system executes a subtract for increments in the negative direction, or preloads negative values if it only increments negatively, or is configured to only move positively.

The constants X'', XY'', Y'' and the initial values for X', Y', and I can be determined by solving a set of linear equations, as discussed above.

In a preferred embodiment of the invention, accuracy requirements are reduced by dividing large triangles into smaller regions and processing each separately. To shade an entire triangle, nine different values are required. Consider incrementally stepping down the left edge of a triangle, as shown in FIG. 7.

Figure 7:
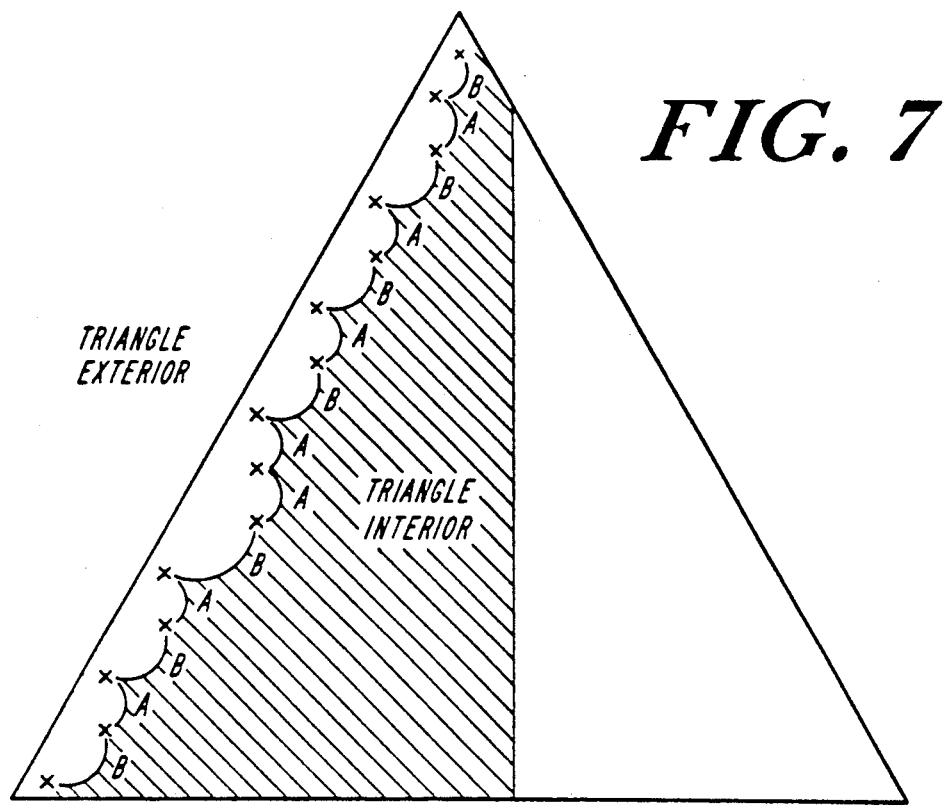
FIG. 7 is a schematic illustration of the incremental "A" and "B" steps executed in accordance with the invention.

Referring to FIG. 7, each pixel that is the start of a horizontal scan of the triangle is marked with "X". To step from one "X" to another requires one of two possible steps, labeled "A" and "B". "A" and "B" are the terms used herein to denote the iterative steps utilized in connection with Bresenham's algorithm, known in the art. In the example of FIG. 7, "A" is down 1 and right 0, and "B" is down 1 and right $-1$. The initial first derivative values and second derivative values for taking a step of A or B can be pre-computed. The second derivatives are held constant, while the first derivative values change. A preferred embodiment of the invention uses the known method of forward differences to efficiently evaluate the interpolation polynomial.

Figure 8:
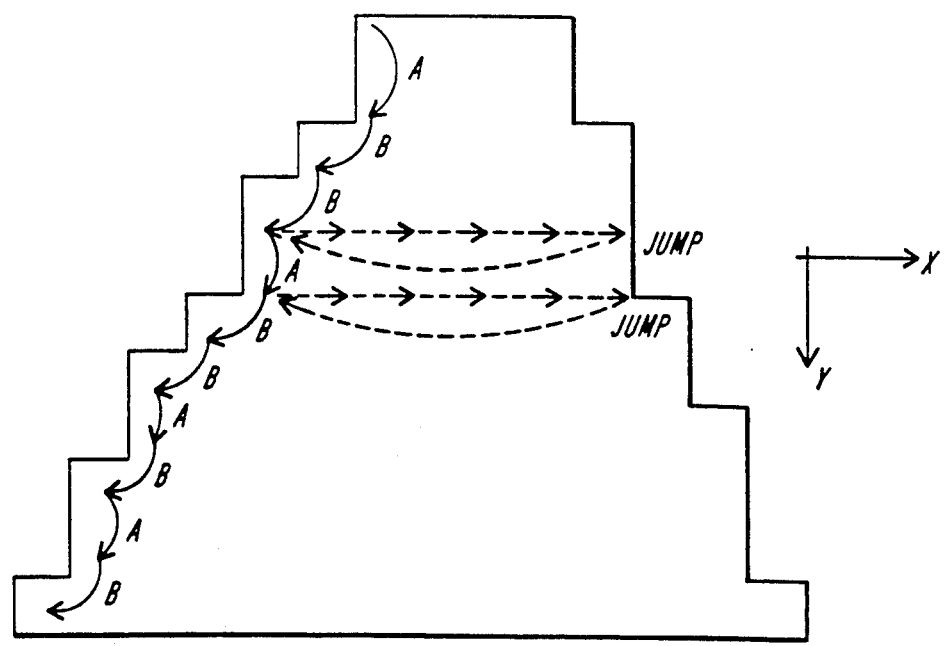
FIG. 8 is a schematic illustration of incremental "A", "B" and "X" steps utilized in "tiling" a region according to the invention.

In accordance with the invention, when shading a trapezoidal region having horizontal top and bottom, three kinds of incremental steps are executed from one pixel to the next. The incremental steps are illustrated in FIG. 8. These are "A" or "B" steps for the left edge, and an X step for moving horizontally over a scan line. Therefore, three first derivatives are required. All three of these first derivatives need to be updated whenever a step of any kind is taken. Therefore, when taking an "A" step, A' is updated by $$d(dI/dA)/dA = A''.$$

When taking a "B" step, A' is updated by:

$$d(dI/dA)/dB = AB''.$$

This is equal to:

$$d(dI/dB)/dA$$

Because the result of a partial of a partial derivative is independent of the order the partials were taken in, (AB″=BA″), three of the nine second derivatives from the above equations are duplicate copies. Thus, in a preferred embodiment of the invention, quadratic interpolation of a region is performed in an add/accumulate structure in which the registers are used as shown in FIGS. 9a–9c. The $X_{sc}$ and $I_{sc}$ registers are used as temporary scratch registers. I and X hold data values for the start of each scan line. This permits stepping horizontally from the origin of each scan without losing the state at each origin. This allows the interpolators to "jump" back to the origin of the current scan after reaching the end of the scan as shown in FIG. 8.

Referring to FIG. 9a, which illustrates register usage in executing an "A" step, there are six second derivatives, four first derivatives, and two color values used for quadratically interpolating a trapezoid. A″, B″ and X″ are direct second derivatives for the given directions. AB″, AX″ and BX″ are the partial derivative in one direction of a partial derivative in another direction. A′, B′ and X′ are the first derivatives in those directions. $X'_{sc}$ is a scratch copy of X' used during the horizontal traverse of the scan line. I is the color intensity value. $I_{sc}$ is a scratch copy used in the same way as $X'_{sc}$. Solid arrows indicate accumulate operations known in the art, and dashed arrows indicate copying of data values into the scratch registers.

A "B" step down the left edge is illustrated in FIG. 9b. After a left edge step to the next line has been executed, and the current scan line is completed. X' is copied into $X'_{sc}$ and I is copied into $I_{sc}$. Horizontal steps along the scan line then are executed as shown in FIG. 9c. $I_{sc}$ is then used as the desired color.

In accordance with the invention, quadratically interpolated vectors are processed in the same manner as A/B steps down (or up) the left edge of a trapezoid. Appendix II, incorporated herein, shows software code for processing a quadratically interpolated vector.

A preferred embodiment of the invention requires fewer bits of registers in the hardware, by utilizing the following arrangement. Note that given the definition herein of the "A" step and "B" step, when incrementing down a trapezoid edge, an "A" step and a "B" step differ only by an "X" step. An interpolator B step can thus be defined as an "A" step +"X" step. For the address generator, an "A" step as defined above is the more nearly vertical of the two edge steps, while for the interpolator, the "A" step is more "out" from the trapezoid, and the B step is more "in" to the trapezoid. This means that in some cases, the address generator will need to reverse the sense of A/B before sending it on to the interpolators. There are four classes of leading edges to consider, as shown in FIG. 10.

Figures 10, 11:
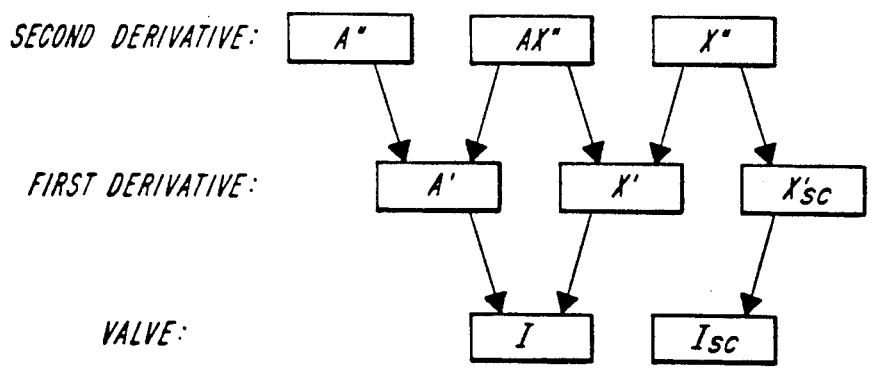
FIG. 10 is a schematic illustration of the classes of leading edges processed by an address generator according to the invention.
FIG. 11 is a block diagram illustrating accumulator paths for a preferred embodiment of the invention.

As FIG. 10 indicates, the scan direction may be either left to right or right to left, and the sign of dX of the leading edge may be either positive or negative. The address generator flips the sense of the A/B step before sending it on to the interpolators when dX is negative and the scan direction is left to right, and when dX is positive and the scan direction is right to left.

Thus, in this embodiment of the invention, the interpolators synthesize a "B" step from an "A" step +"X" step. The register diagram is illustrated in FIG. 11, and the arrows show possible successive addition paths. It will be apparent that $X'_{sc}$ and $I_{sc}$ can also be loaded with same data as X' and I, respectively. Note that this significantly reduces the number of registers required to execute interpolation.

Figure 9:
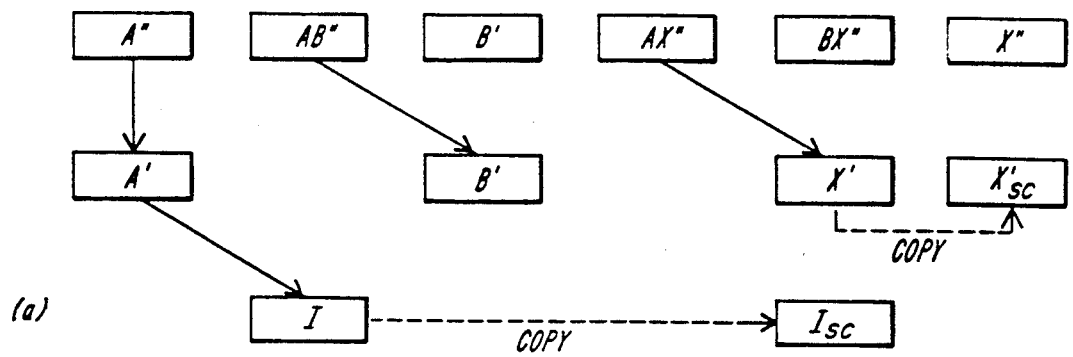
FIGS. 9a, 9b and 9c are block diagrams of registers utilized in executing quadratic interpolation in incremental "A", "B" and "X" steps, respectively.
Figure 9:
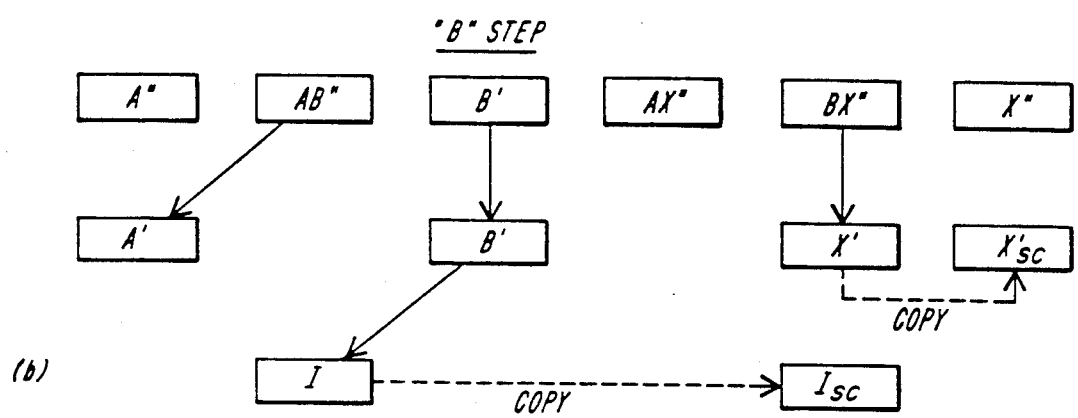
Figure 9:
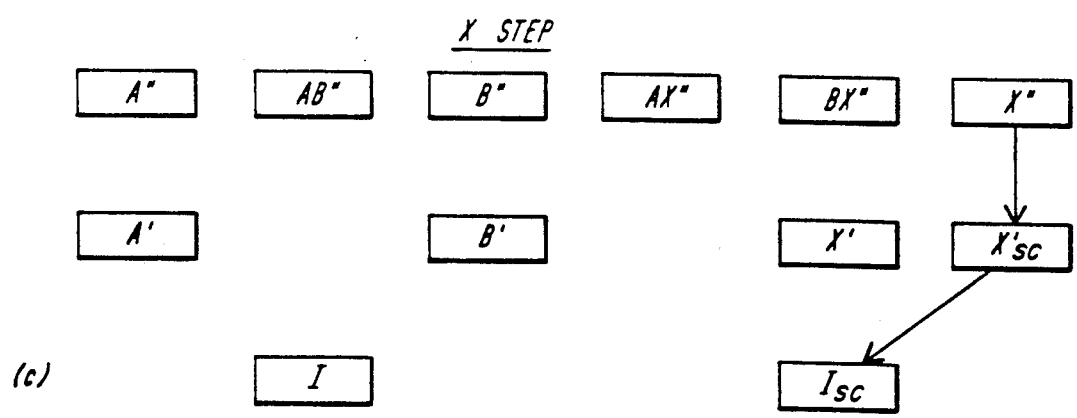

For each of the three steps, the following operations are executed, as illustrated in FIG. 9:

"A" step:
$I. I_{sc} \leftarrow I + A'$
$A' \leftarrow A' + A''$
$X'.X'_{sc} \leftarrow X' + AX''$ "B" step:
$I. I_{sc} \leftarrow I + A' + X' + AX''$
$A' \leftarrow A' + AA'' + AX''$
$X' X_{sc} \leftarrow X' + X' + AX''$ "X" (horizontal) step:
$I_{sc} \leftarrow I_{sc} + X'_{sc}$
$X'_{sc} \leftarrow X'_{sc} + X''$ $I_{sc}$ is used as the interpolator output value.

Appendix III, incorporated herein, sets forth two subroutines that perform most of the operations related to quadratic interpolation according to the invention. "DBUF_POLY.PAS" is the driving routine, feeding setup and "trapezoid" commands to a simulator. "ATG_SINTERPOLATE.PAS" is the routine inside the simulator that is responsible for incrementing the interpolators by one step.

The preceding descriptions set forth embodiments of the invention which execute incremental evaluation. It will be apparent to those skilled in the art that the invention may also be practiced in connection with logic elements which perform non-incremental evaluation. Such logic elements, known in the art, provide direct evaluation of polynomials, and, in a preferred embodiment, execute a spline of selected control points.

It will thus be seen that the invention efficiently attains the objects set forth above. It will be understood that changes may be made in the above construction and in the foregoing sequences of operation without departing from the scope of the invention. It is accordingly intended that all matter contained in the above description or shown in the accompanying drawings be interpreted as illustrative rather than in a limiting sense.

It is also to be understood that the following claims are intended to cover all the generic and specific features of the invention as described herein, and all statements of the scope of the invention which, as a matter of language, might be said to fall therebetween.

Having described the invention, what is claimed as new and secured by letters patent is:

1. In a computer graphics system for generating and displaying images of objects on a display device,
   the images including pixels having pixel values,
   the images being defined by digital electrical signals representative of the pixel values,
   the system including elements for processing the digital electrical signals to modify the images displayed on the display device,
   the improvement comprising
   A. electrical interpolation circuit means
      for receiving and processing a first set of digital electrical signals defining first pixel values
      to generate a second set of digital electrical signals defining second pixel values representative of an interpolated, shaded bitmap image representative of a given object,
      said second set of digital electrical signals being transmittable to the display device to display said interpolated, shaded bitmap image,
      said electrical interpolation circuit means including
         (i) means for executing, on said first set of digital electrical signals, interpolation of order n, where n is an integer greater than one, and
         (ii) electrical incremental evaluation circuit means,
            for receiving said first set of digital electrical signals and
            for executing incremental evaluation of successive ones of said first set of digital electrical signals
            to generate said second set of digital electrical signals representative of said interpolated, shaded bitmap image, and
   B. output means, in electrical communication with said electrical interpolation circuit means, and electrically connectable to the display device, for transmitting said second set of digital electrical signals to the display device to display said interpolated, shaded bitmap image representative of an object.

2. In a system according to claim 1, the further improvement wherein said interpolation circuit means includes forward differencing means for computing forward difference values to incrementally evaluate a given polynomial.

3. In a system according to claim 2, the further improvement wherein said forward differencing means includes means for computing forward differences in three directions of incremental evaluation.

4. In a system according to claim 3, the further improvement wherein said forward differencing means includes means for incremental evaluation in two directions associated with a given vector, and in one direction along a predetermined coordinate axis.

5. In a system according to claim 2, the further improvement wherein said forward differencing means includes means for computing forward differences in two directions of incremental evaluation.

6. In a system according to claim 5, the further improvement wherein said forward differencing means includes means for computing forward differences in two orthogonal directions of incremental evaluation.

7. In a system according to claim 5, the further improvement wherein said forward differencing means includes means for computing forward differences in non-orthogonal directions of incremental evaluation.

8. In a system according to claim 7, the further improvement wherein said forward differencing means includes means for computing forward differences in a first direction of incremental evaluation associated with a given vector, and in a second direction of incremental evaluation along a predetermined coordinate axis.

9. In a computer graphics system for generating and displaying images of objects on a display device,
   the images including pixels having pixel values,
   the images being defined by digital electrical signals representative of the pixel values,
   the system including elements for processing the digital electrical signals to modify the images displayed on the display device,
   the improvement comprising
   A. electrical interpolation circuit means for interpolating a first set of digital electrical signals defining first pixel values
      to generate a second set of digital electrical signals defining second pixel values representative of an interpolated, shaded bitmap image representative of a given object,
      said second step of digital electrical signals associated with said bitmap image being storable in a digital electrical storage device and transmittable to the display device to display said interpolated, shaded bitmap image,
      said electrical interpolation circuit means including
         (i) means for executing, on said first set of digital electrical signals, interpolation of order n, where n is an integer greater than one, and
         (ii) electrical non-incremental evaluation circuit means
            for receiving said first set of digital electrical signals and
            for executing non-incremental evaluation of successive ones of said first set of digital electrical signals
            to generate said second set of digital electrical signals representative of said interpolated, shaded bitmap image, and
   B. output means, in electrical communication with said electrical interpolation means, and electrically connectable to the display device, for transmitting said second set of digital electrical signals to the display device for displaying said interpolated, shaded bitmap image representative of an object.

10. In a system according to claim 9, the further improvement comprising means for executing spline functions utilizing values of selected control points.

11. In a system according to claim 9, the further improvement comprising means for executing direct evaluation of a given polynomial.

12. A digital computer graphics processing system for generating, modifying, and displaying images of objects on a display device,
- the images including pixels having values,
- the images being defined by digital electrical signals representative of a stored bitmap image representative of a given object,
- the bitmap image including interpolated digital electrical signals representative of interpolated pixel values, the digital electrical signals being stored in a memory element having a plurality of memory addresses so that each digital electrical signal is stored in association with a particular memory address, the system comprising:
A. electrical address generator circuit means for
  (i) receiving digital electrical coordinate signals representative of coordinates associated with a first image of the given object, and
  (ii) generating digital electrical control signals having values representative of successive pixel addresses corresponding to the first image of the object,
B. electrical quadratic interpolator circuit means, electrically coupled with said address generator circuit means,
  for quadratically interpolating, responsive to said control signals, first digital electrical signals representative of first pixel values associated with successive pixel addresses corresponding to the first image of the object,
  to generate said interpolated digital electrical signals representative of quadratically interpolated pixel values
C. electrical storage means,
  electrically coupled with said address generator circuit means and said quadratic interpolator circuit means, and
  including a plurality of addressable memory locations,
  for storing, responsive to said digital electrical control signals, said quadratically interpolated digital electrical signals generated by said quadratic interpolator circuit means, in addressable memory locations corresponding to the addresses represented by said control signal values,
  so that a quadratically interpolated, shaded bitmap image including quadratically interpolated digital electrical signals is generated, and
D. output means, in electrical communication with said electrical interpolation means, and electrically connectable to the display device, for transmitting said quadratically interpolated digital electrical signals stored in said electrical storage means to the display device for displaying said interpolated, shaded bitmap image representative of the object.

13. A system according to claim 12, wherein said storage means includes random access memory (RAM) elements including a plurality of addressable memory locations.

14. A system according to claim 13, wherein said quadratic interpolator means includes a plurality of register means for accumulating resultant data values generated by iterative arithmetic operations.

15. A system according to claim 14, wherein said quadratic interpolator means includes forward differencing means, electrically coupled with said register means, for calculating forward difference values.

* * * * *